(12) United States Patent
Heap

(10) Patent No.: US 8,209,097 B2
(45) Date of Patent: Jun. 26, 2012

(54) METHOD AND CONTROL ARCHITECTURE TO DETERMINE MOTOR TORQUE SPLIT IN FIXED GEAR OPERATION FOR A HYBRID POWERTRAIN SYSTEM

(75) Inventor: Anthony H. Heap, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 856 days.

(21) Appl. No.: 12/250,181

(22) Filed: Oct. 13, 2008

(65) Prior Publication Data
US 2009/0115349 A1    May 7, 2009

Related U.S. Application Data

(60) Provisional application No. 60/986,046, filed on Nov. 7, 2007.

(51) Int. Cl.
*G06G 7/00*    (2006.01)
(52) U.S. Cl. .......................................... 701/54
(58) Field of Classification Search ...................... 701/54
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |

(Continued)

FOREIGN PATENT DOCUMENTS

EP    1118492 A2    7/2001

(Continued)

OTHER PUBLICATIONS

Martin J. Hoeijmakers, Member, IEEE, and Jan A. Ferreira, Fellow, IEEE, "The Electric Variable Transmission", Jul./Aug. 2006, IEEE Transactions on Industry Applications, vol. 42, No. 4.*

*Primary Examiner* — James Trammell
*Assistant Examiner* — Truc M Do

(57) ABSTRACT

An electro-mechanical transmission is operative to transmit mechanical torque originating from an engine and first and second electric machines to an output member. The electric machines are electrically-operatively connected to an energy storage system for electrical power flow therebetween. A Method for operating the electro-mechanical transmission includes operating the electro-mechanical transmission in a fixed gear operating range state, determining a minimum power flow between the energy storage system and the first and second electric machines to meet an operator torque request based upon electrical power constraints and motor torque constraints, commanding a motor torque from the first electric machine based upon the minimum power flow, and commanding a motor torque from the second electric machine based upon the minimum power flow, a torque input from the engine and the commanded motor torque from the first electric machine to meet the operator torque request in the fixed gear operating range state.

18 Claims, 4 Drawing Sheets

U.S. PATENT DOCUMENTS

| | | | |
|---|---|---|---|
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0102082 A1 | 5/2005 | Shinichiro et al. |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1* | 11/2005 | Heap et al. .................. 477/3 |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1* | 11/2005 | Hubbard et al. ........... 701/54 |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |

| | | |
|---|---|---|
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

FOREIGN PATENT DOCUMENTS

EP 1614574 A2 1/2006

* cited by examiner

METHOD AND CONTROL ARCHITECTURE TO DETERMINE MOTOR TORQUE SPLIT IN FIXED GEAR OPERATION FOR A HYBRID POWERTRAIN SYSTEM

CROSS REFERENCE TO RELATED APPLICATIONS

This application claims the benefit of U.S. Provisional Application No. 60/986,046 filed on Nov. 7, 2007 which is hereby incorporated herein by reference.

TECHNICAL FIELD

This disclosure pertains to control systems for powertrains employing electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively coupled to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy potential that is storable in an electrical energy storage device. A control system monitors various inputs from the vehicle and the operator and provides operational control of the powertrain, including controlling transmission operating state and gear shifting, controlling the torque-generative devices, and regulating the electrical power interchange between the electrical energy storage device and the electric machines to manage outputs of the transmission, including torque and rotational speed.

SUMMARY

An electro-mechanical transmission is operative to transmit mechanical torque originating from an engine and first and second electric machines to an output member. The electric machines are electrically-operatively connected to an energy storage system for electrical power flow therebetween. A Method for operating the electro-mechanical transmission includes operating the electro-mechanical transmission in a fixed gear operating range state, determining a minimum power flow between the energy storage system and the first and second electric machines to meet an operator torque request based upon electrical power constraints and motor torque constraints, commanding a motor torque from the first electric machine based upon the minimum power flow, and commanding a motor torque from the second electric machine based upon the minimum power flow, a torque input from the engine and the commanded motor torque from the first electric machine to meet the operator torque request in the fixed gear operating range state.

BRIEF DESCRIPTION OF THE DRAWINGS

One or more embodiments will now be described, by way of example, with reference to the accompanying drawings, in which.

DETAILED DESCRIPTION

Figure 1:
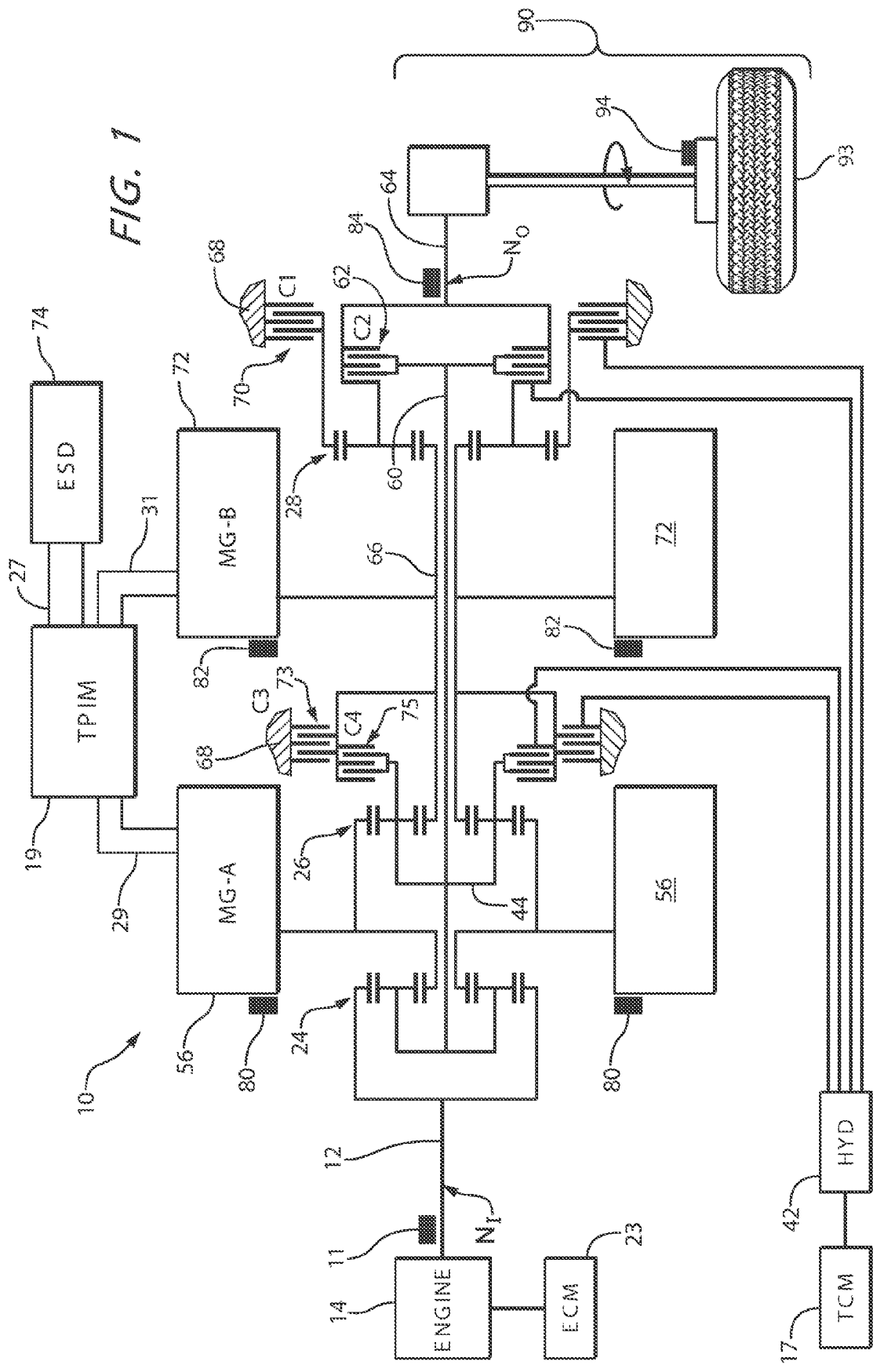
FIG. 1 is a schematic diagram of an exemplary powertrain, in accordance with the present disclosure.
Figure 2:
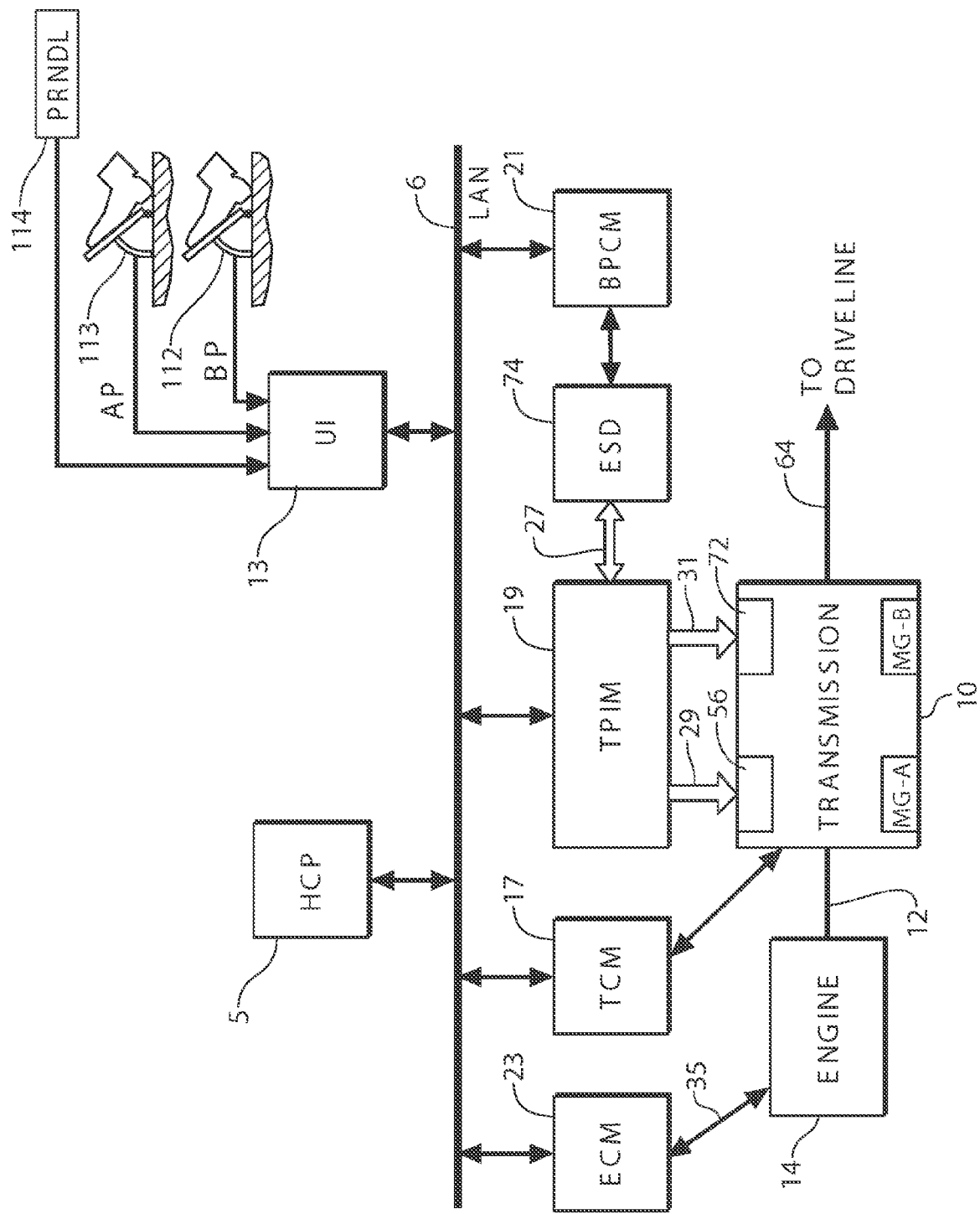
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19 and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93 is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to meet the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines various commands, including: the operator torque request, an output torque command ('T$_{CMD}$') to the driveline 90, an engine input torque command, clutch torque(s) ('T$_{CL}$') for the applied torque-transfer clutches C1 70, C2 62, C3 73, C4 75 of the transmission 10; and the torque commands T$_A$ and T$_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, T$_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, N$_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, N$_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 signally connects to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range P$_{BAT\_MIN}$ to P$_{BAT\_MAX}$.

Each of the control modules ECM 23, TCM 17, TPIM 19, and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode I | C1 70 | |
| M1_Eng_On | ON | EVT Mode I | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., N$_I$/N$_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, N$_A$ and N$_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request, communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

The control routine, described in detail with reference to the electro-mechanical powertrain detailed hereinabove, comprises operating the two-mode hybrid powertrain to minimize the battery power while meeting the operator torque request in one of the fixed gear operating range states. The control routine comprises operating the transmission 10 in one of the fixed gear operating range states, i.e., with two clutches applied and locked to transmit torque to the output member 64. The operator torque request, $T_{O\_REQ}$ is monitored and determined, along with the engine input torque $T_I$. A minimum power flow between the ESD 74 and the first and second electric machines 56 and 72 is determined based upon the operator torque request and the engine input torque $T_I$. Torque output from the one of the first and second electric machines 56 and 72 is controlled based upon the determined minimum power flow from the energy storage system. Torque output from the other of the first and second electric machines 56 and 72 is controlled based upon the engine input torque $T_I$ and the torque commands for the first and second electric machines 56 and 72, $T_A$ and $T_B$, respectively, which minimizes the power flow from the ESD 74 to meet the operator torque request in the fixed gear operating range state. This is now described in greater detail.

When operating the transmission 10 in one of the fixed gear operating states, motor torque commands for the first and second electric machines 56 and 72, $T_A$ and $T_B$, respectively, can be determined with reference to a general equation, as follows:

$$T_A = [k1]T_B + [k2]T_O + [k3]T_I + [k4][\dot{N}_I] + [k5][N_I] + [k6]\begin{bmatrix} T_{CL\_N1} \\ T_{CL\_N2} \end{bmatrix} \quad [1]$$

wherein k1-k6 comprise appropriately sized vectors consisting of coefficients determined based upon physical characteristics of the powertrain system, e.g., gear ratios. In Eq. 1, the output torque, $T_O$, is known, as it is intended to match the operator torque request, $T_{O\_REQ}$. The input torque $T_I$ is known, as are the transmission input and output speeds $N_I$ and $N_O$. Furthermore, $\dot{N}_I$ and $\dot{N}_O$ represent rates of changes of the input and output speeds, preferably predetermined. $T_{CL\_N1}$ and $T_{CL\_N2}$ comprise reactive clutch torques for the two clutches that are not applied during operation in the specific fixed gear. Thus there is a single degree of freedom, $T_B$, from which $T_A$ can be determined, providing an infinite number of solutions for the motor torque commands $T_A$ and $T_B$ for the first and second electric machines 56 and 72 respectively. Eq. 1 can be reduced to either of Eqs. 2A or 2B, as follows.

$$T_A = \alpha * T_B + \beta \quad [2A]$$

$$T_B = c_1 * T_A + c_2 \quad [2B]$$

Furthermore, to minimize the battery power $P_{BAT}$ having $T_B$ as an independent variable which is subject to constraints on $T_A$ and $P_{BAT}$, and substituting for $T_B = c_1 T_A + c_2$, as depicted with reference to Eq. 2B, a battery system equation is written as in Eq. 3:

$$\begin{aligned} P_{BAT} &= (a_2 T_A^2 + a_1 T_A + a_0) + (b_2 T_B^2 + b_1 T_B + b_0) + P_{DC\,LOAD} \quad [3] \\ &= (a_2 T_A^2 + a_1 T_A + a_0) + \\ &\quad (b_2(c_1 T_A + c_2)^2 + b_1(c_1 T_A + c_2) + b_0) + P_{DC\,LOAD} \end{aligned}$$

wherein $a_n$, $b_n$, $c_n$ comprise scalar values.

The substance of Eq. 3 is reducible to a quadratic equation as a function of $T_A$ in Eq. 4.

$$P_{BAT} = d_2 T_A^2 + d_1 T_A + d_0 \quad [4]$$

Again, the factors $d_n$ comprise scalar values.

Figure 3:
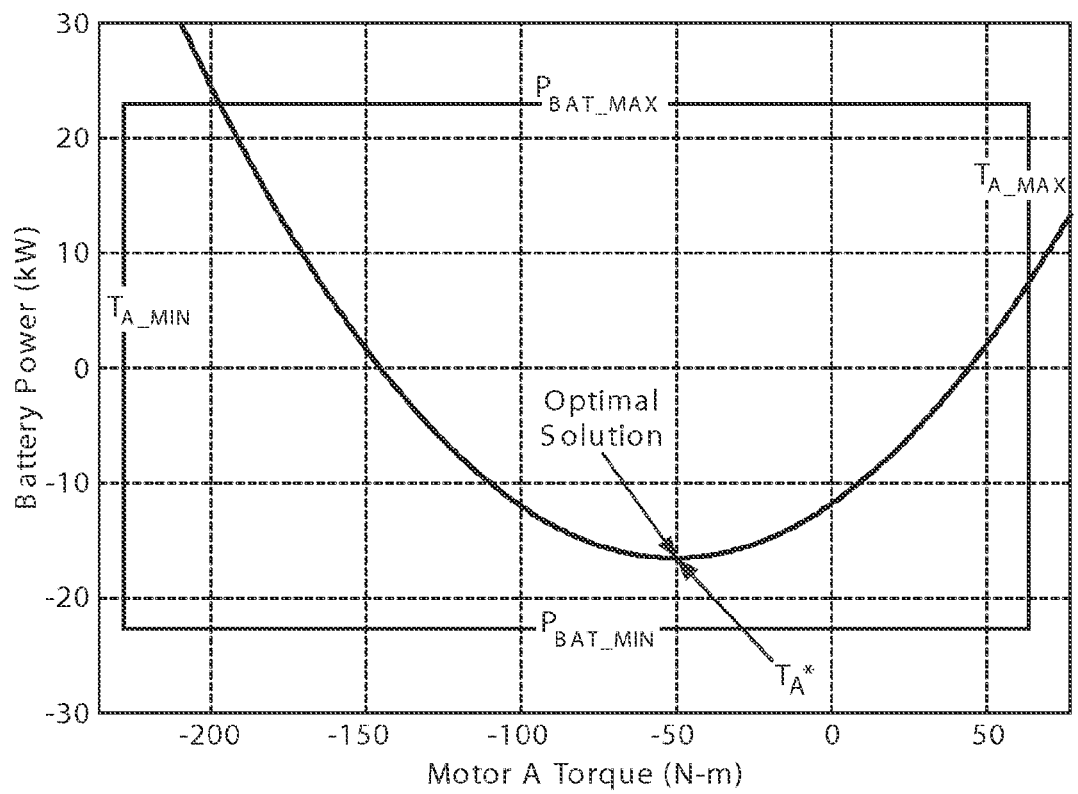
FIGS. 3-5 are graphical depictions, in accordance with the present disclosure.

FIG. 3 graphically depicts exemplary data for the first electric machine 56 plotted over an available range of torque states for the motor torque for the first electric machine 56 $T_A$ as a function of battery power $P_{BAT}$ consisting of a parabolic plot illustrative of the battery power $P_{BAT}$ plotted based upon the range of motor torque states for the first electric machine 56 $T_A$ from a minimum to a maximum motor torque, i.e., $T_{A\_MIN}$ to $T_{A\_MAX}$. The optimal, or preferred solution, is depicted as a motor torque corresponding to a minimum state for the battery power, circumscribed or limited by the minimum and maximum battery powers $P_{BAT\_MIN}$ and $P_{BAT\_MAX}$.

The optimal solution is derived by taking a partial differential of Eq. 4 for $T_A$ and solving it, as depicted in Eq. 5:

$$\frac{dP_{BAT}}{dT_A} = 2*d_2*T_A + d_1 = 0 \qquad [5]$$

yielding the optimal solution of $T_A^*$, which comprises the motor torque state for the first electric machine 56 $T_A$ at which the battery power $P_{BAT}$ is a minimum, as follows.

$$T_A^* = d_1/2*d_2 \qquad [6]$$

As stated previously and depicted with reference again to FIG. 3, power flow from the ESD 74 based upon torque output from one of the electric machines, e.g., the first electric machine 56, is parabolic in nature. A similar optimal solution can be derived for the second electric machine 72 and $T_B$.

Figure 4:
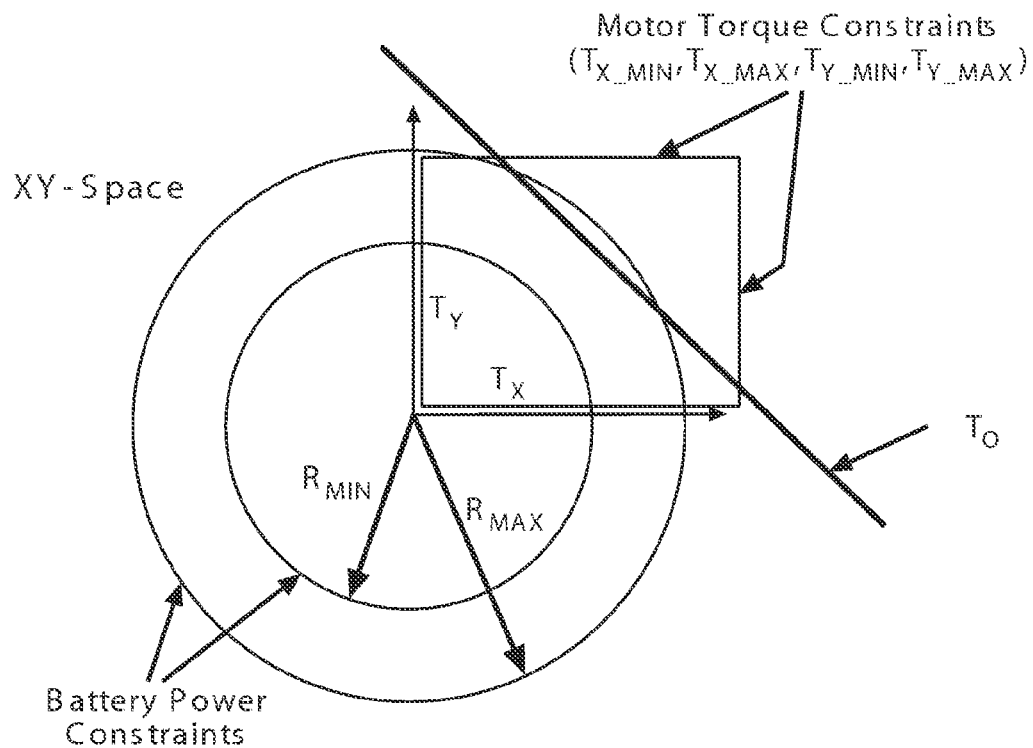

Minimum power flows between the ESD 74 and the first and second electric machines 56 and 72 are determined as follows, using graphical depictions and equations. The maximum and minimum constraints on battery power of the ESD 74, i.e., $P_{BAT\_MIN}$ and $P_{BAT\_MAX}$, and corresponding motor torque constraints of the first and second electric machines 56 and 72, i.e., $T_{A\_MIN}$, $T_{A\_MAX}$, and $T_{B\_MIN}$, $T_{B\_MAX}$ are linearly transformable to an second operating region, referred to herein as XY-space, and depicted as $T_{X\_MIN}$, $T_{X\_MAX}$, and $T_{Y\_MIN}$, $T_{Y\_MAX}$ with reference to FIG. 4. The battery power constraints $P_{BAT\_MIN}$ and $P_{BAT\_MAX}$ are linearly transformed to radii $R_{MIN}$ and $R_{MAX}$ of the XY-space, as follows.

The battery power constraints, $P_{BAT\_MIN}$ and $P_{BAT\_MAX}$, are linearly transformed to the XY-space, based upon constraints of the ESD 74. Calculation of the battery power $P_{BAT}$ is as follows, in Eq. 7:

$$P_{BAT} = P_{A\_ELEC} + P_{B\_ELEC} + P_{DC\_LOAD} \qquad [7]$$

wherein $P_{A\_ELEC}$ comprises electrical power from the first electric machine 56, $P_{B\_ELEC}$ comprises electrical power from the second electric machine 72, and $P_{DC\_LOAD}$ comprises known DC system loads including accessory loads.

Substituting equations for $P_{A\_ELEC}$ and $P_{B\_ELEC}$, yields Eq. 8:

$$P_{BAT} = (P_{A\_MECH} + P_{A\_LOSS}) + (P_{B\_MECH} + P_{B\_LOSS}) + P_{DC\_LOAD} \qquad [8]$$

wherein $P_{A\_MECH}$ comprises mechanical power from the first electric machine 56, $P_{A\_LOSS}$ comprises power losses from the first electric machine 56, $P_{B\_MECH}$ comprises mechanical power from the second electric machine 72, and $P_{B\_LOSS}$ comprises power losses from the second electric machine 72.

Eq. 8 can be restated as Eq. 9, below, wherein motor speeds $N_A$ and $N_B$ and motor torques $T_A$ and $T_B$ are substituted for power $P_A$ and $P_B$. This includes an assumption that motor and inverter losses can be mathematically modeled as a quadratic equation based upon torque:

$$P_{BAT} = (N_A T_A + (a_1(N_A)T_A^2 + a_2(N_A)T_A + a_3(N_A))) + \qquad [9]$$
$$(N_B T_B + (b_1(N_B)T_B^2 + b_2(N_B)T_B + b_3(N_B))) + P_{DC\_LOAD}$$

wherein $N_A$, $N_B$ comprise rotational speeds of the first and second electric machines 56 and 72, $T_A$, $T_B$ comprise the motor torques of the first and second electric machines 56 and 72, and $a_1$, $a_2$, $a_3$, $b_1$, $b_2$, $b_3$ each comprise quadratic coefficients which are a function of the respective motor speeds $N_A$, and $N_B$.

Eq. 9 can be restated as Eq. 10, as follows.

$$P_{BAT} = a_1 * T_A^2 + (N_A + a_2) * T_A + \qquad [10]$$
$$b_1 * T_B^2 + (N_B + b_2) * T_B + a3 + b3 + P_{DC\_LOAD}$$

Eq. 10 is reduced to Eq. 11, as follows.

$$P_{BAT} = R^2 + C \qquad [11]$$

The substance of Eq. 11 yields the transformation of the motor torque for the first electric machine 56, i.e., $T_A$, to $T_{A\_X}$ and the transformation of the motor torque for the second electric machine 72, i.e., $T_B$, to $T_{B\_Y}$. The vector defined by $[T_{A\_X}, T_{B\_Y}]$ translates the battery power $P_{BAT}$. Therefore, the maximum and minimum battery power, $P_{BAT\_MAX}$ and $P_{BAT\_MIN}$ can be calculated and graphed as radii, $R_{MAX}$ and $R_{MIN}$, with a center at locus (0,0) in the transformed XY-space, as shown with reference to FIG. 4. Minimum and maximum battery power $P_{BAT\_MIN}$ and $P_{BAT\_MAX}$ are preferably correlated to various states of the ESD 74, e.g. state of charge, temperature, voltage and usage (amp-hour/hour). The parameter C, above, is defined as the absolute minimum possible battery power at given speeds, $N_A$, $N_B$, ignoring motor torque limits, and comprises a representation of the DC load on the ESD 74.

The motor torque constraints, i.e., $T_{A\_MIN}$, $T_{A\_MAX}$, and $T_{B\_MIN}$, $T_{B\_MAX}$ are linearly transformed to $T_{X\_MIN}$, $T_{X\_MAX}$, and $T_{Y\_MIN}$, $T_{Y\_MAX}$. The motor torque values $T_A$ and $T_B$ are transformable to vectors described in dimensions of $T_X$ and $T_Y$, as in Eq. 12, as follows.

$$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \qquad [12]$$

wherein $T_X$ is a linear transformation of $T_A$, $T_Y$ is a linear transformation of $T_B$, and $A_1$, $A_2$, $B_1$, $B_2$ comprise scalar values.

A line representative of a constant state for the output torque $T_O$ is depicted. The output torque can vary over a range between no operator torque request, corresponding to ($T_X$, $T_Y$) of (0,0) and a maximum operator torque request, corresponding to ($T_X$, $T_Y$) of ($T_{X\_MAX}$, $T_{Y\_MAX}$). A representative line of constant output torque $T_O$ as depicted passes through the motor torque constraints and the battery power constraints, and indicates the ability of the first and second electric machines 56 and 72 to meet the operator torque request $T_{O\_REQ}$ less the actual engine input torque $T_I$. In so transforming the constraints of motor torques and battery power, the system constraint problem is reduced to calculating and finding intersections between lines, and between lines and circles to determine a minimum power flow, and to determine an optimized motor torque output from the first electrical machine 56, i.e., $T_A$, and an optimized motor torque output from the second electrical machine 72, i.e., $T_B$.

The transformed vector $[T_X, T_Y]$ determined in Eq. 12 is solved simultaneously with the torque space identified by $R_{MIN}$ and $R_{MAX}$, to identify output torques from the first and second electrical machines 56 and 72 that are common to the first operating space and the second operating space, in $T_X/T_Y$ space.

An unconstrained optimal solution for the motor torques in fixed gear operation is provided in Eq. 13, which comprises a restatement of Eq. 11, with the battery power is defined in terms of the $T_X/T_Y$ space, as follows.

$$P_{BAT} = T_X^2 + T_Y^2 + C \quad [13]$$

Eq. 13 is transformable to Eq. 14, using Eq. 12, as follows.

$$P_{BAT} = (A_1 T_A + A_2)^2 + (B_1 T_B + B_2)^2 + C \quad [14]$$

A partial derivative of battery power with respect to $T_A$ is executed, yielding Eq. 15, as follows.

$$\frac{dP_{BAT}}{dT_A} = \frac{\partial P_{BAT}}{\partial T_A} + \frac{\partial P_{BAT}}{\partial T_B}\left(\frac{\partial T_B}{\partial T_A}\right) \quad [15]$$

The result of Eq. 15 is made equal to zero to optimize the change in battery power.

Optimal values for motor torques $T_A$ and $T_B$ are determinable with reference to $T_X/T_Y$ space, i.e., $T_X^*$ and $T_Y^*$, using the aforementioned linear transformation.

As previously depicted, translating the equations to the $T_X/T_Y$ space yields the following.

$$\begin{aligned} P_{BAT} &= T_X^2 + T_Y^2 + C \\ &= (A_1 T_A + A_2)^2 + (B_1 T_B + B_2)^2 + C \\ &= (a_1 T_O + a_2)^2 + (b_1 T_O + b_2)^2 + C \end{aligned}$$

A partial derivative of $P_{BAT}$ for output torque $T_O$ yields Eq. 16, as follows.

$$\frac{dP_{BAT}}{dT_O} = 2a_1(a_1 T_O + a_2) + 2b_1(b_1 T_O + b_2) \quad [16]$$

To optimize $P_{BAT}$ the partial derivative is set equal to zero, and solved, as in Eq. 17, as follows.

$$T_O^* = \frac{-a_1 a_2 - b_1 b_2}{a_1^2 + b_1^2} \quad [17]$$

Thus, the optimal solution in $T_X/T_Y$ space is shown, in Eqs. 18A and 18B, as follows.

$$P_{BAT}^* = (T_X^*)^2 + (T_Y^*)^2 + C \quad [18A]$$
$$= \left(1 + \frac{a_1^2}{b_1^2}\right)(T_X^*)^2 + C$$

$$P_{BAT}^* = (T_X^*)^2 + (T_Y^*)^2 = \frac{(a_2 b_1 - a_1 b_2)^2}{a_1^2 + b_1^2} + C \quad [18B]$$

The optimal motor torque output from the first electric machine 56 and the optimal motor torque output from the second electric machine 72 in $T_X/T_Y$ space reduces to Eq. 19, as follows.

$$T_Y = (B_2/A_2)^* T_X \quad [19]$$

Figure 5:
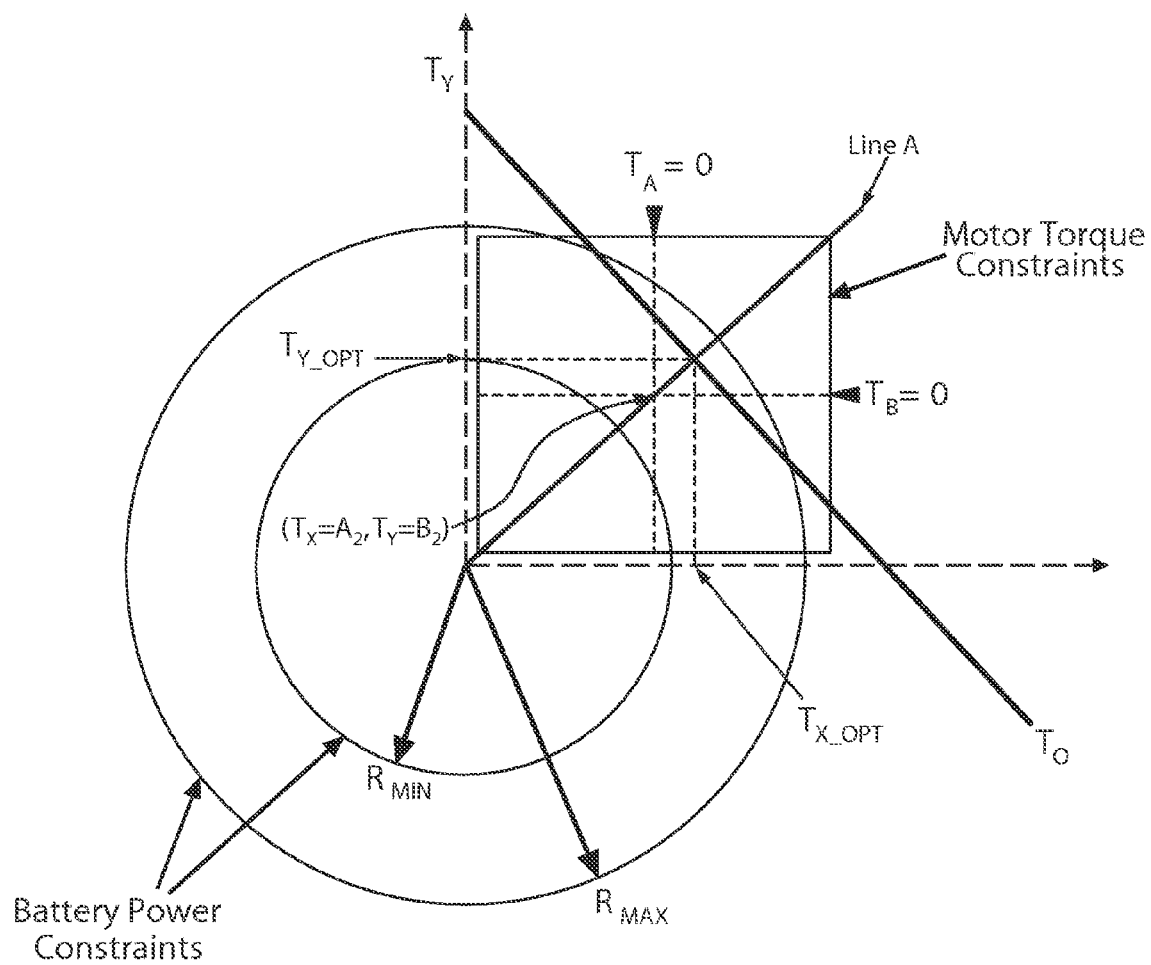

The optimal motor torque split is depicted graphically as Line A in FIG. 5, which includes points in XY-space of (0,0) and $T_A = 0$, $T_B = 0$, as determined for the motor torque constraints, i.e., $A_2 = 0$, $B_2 = 0$. Line A emerges as a series of points in XY-space wherein $A_2 = B_2$.

Thus, in XY-space, Line A, passing through points (0,0) and ($A_2 = 0$, $B_2 = 0$) is perpendicular to line $T_O$ yields optimized values for $T_X$ and $T_Y$. Thus the optimized torques in the XY-space ('$T_{X\_OPT}$' and '$T_{Y\_OPT}$') can be determined and transformed to the AB space, which yields the optimum torque values $T_{A\_OPT}$ and $T_{B\_OPT}$ for the motor torque constraints for the first and second electric machines 56 and 72 and the battery power constraints for the ESD 74 determined for operation of the transmission 10 in one of the fixed gear operating range states. In operation, the preferred motor torques $T_{A\_OPT}$ and $T_{B\_OPT}$ for a given output torque $T_O$ are derived during ongoing operation, or developed off-line and precalibrated during engine and system development. The electric power flow to the first electric machine 56 is controlled to meet the optimized motor torque $T_{A\_OPT}$ and the electric power flow to second electric machine 72 is control to achieve the optimized motor torque, $T_{B\_OPT}$. The motor torques from the first and second electric machines 56 and 72 are combined with the input torque $T_I$ through the transmission 10 to meet the operator torque request $T_{O\_REQ}$.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an electro-mechanical transmission operative to transmit an output torque originating from an engine and first and second electric machines to an output member, the electric machines electrically-operatively connected to an energy storage system for electrical power flow therebetween, the method comprising:
   operating the electro-mechanical transmission in a fixed gear operating range state;
   determining a minimum power flow between the energy storage system and the first and second electric machines to meet an operator torque request based upon electrical power constraints and motor torque constraints comprising developing a mathematical formula representative of the power flow between the energy storage system and the first and second electric machines based upon clutch reaction torques, transmission speed ratios, and the motor torques from the first and second electric machines and the torque input from the engine, executing a partial derivative of the mathematical formula with respect to output torque to determine said minimum power flow, and equating said partial derivative to zero and solving for the output torque;
   controlling-a motor torque from the first electric machine based upon the minimum power flow; and
   controlling a motor torque from the second electric machine based upon the minimum power flow, a torque input from the engine and the motor torque from the first electric machine to meet the operator torque request in the fixed gear operating range state.

2. The method of claim 1, further comprising: determining the motor torque output from the first electric machine based upon the electrical power constraints of the energy storage device and a motor torque output from the second electric machine that minimizes electric power flow between the energy storage system and the first electric machine.

3. The method of claim 2, further comprising determining the motor torque output from the first electric machine to meet the operator torque request based upon the electrical power constraints and motor torque constraints.

4. The method of claim 3, wherein determining the electrical power constraints of the energy storage device comprises determining maximum and minimum electrical power outputs from the energy storage device based upon a battery state of charge, a battery temperature, and an electric current throughput.

5. The method of claim 1, further comprising determining minimum power flows between the energy storage system and the first and second electric machines to meet the operator torque request based upon the electrical power constraints and the motor torque constraints and based upon the torque input from the engine.

6. The method of claim 1, comprising determining a relationship between the motor torque from the first electric machine and the motor torque from the second electric machine based upon the partial derivative of the mathematical formula.

7. The method of claim 1, further comprising linearly transforming the mathematical formula representative of the output torque to a second operating space.

8. The method of claim 7, further comprising precalibrating the motor torques for the first and second electric machines for a given output torque.

9. The method of claim 1, further comprising:
determining the electrical power constraints of the energy storage device;
determining a range of motor torques from the first electric machine to meet the operator torque request based upon the electrical power constraints of the energy storage device;
determining a range of motor torques from the second electric machine to meet the operator torque request based upon the electrical power constraints of the energy storage device;
identifying a minimum motor torque from the first electric machine within the electrical power constraints of the energy storage device and within the range of motor torques from the first electric machine; and
identifying a motor torque from the second electric machine to meet the operator torque request based upon the electrical power constraints of the energy storage device and the identified minimum motor torque from the first electric machine and within the range of motor torques from the second electric machine.

10. The method of claim 1, further comprising selectively applying torque-transmitting clutches to operate the electro-mechanical transmission in the fixed gear operating range state.

11. Method for operating a powertrain including an internal combustion engine, first and second electric machines, and an electro-mechanical transmission mechanically-operatively coupled to transmit torque to an output member to meet an operator torque request, the first and second electric machines electrically-operatively connected to an energy storage system for electrical power flow therebetween, the method comprising:
operating the electro-mechanical transmission in a fixed gear operating range state;
determining optimal electrical power flow between the energy storage system and the first and second electric machines based upon maximum and minimum electrical power potentials of the energy storage system and output torque constraints of the first and second electric machines comprising developing a mathematical formula representative of the power flow between the energy storage system and the first and second electric machines based upon clutch reaction torques, transmission speed ratios, and motor torques from the first and second electric machines and the torque input from the engine, executing a partial derivative of the mathematical formula with respect to output torque to determine said optimal electrical power flow, and equating said partial derivative to zero and solving for the output torque;
controlling a motor torque from the first electric machine based upon the optimal electrical power flow between the energy storage system and the first and second electric machines; and
controlling a motor torque from the second electric machine based upon a torque input from the engine and the commanded motor torque from the first electric machine to meet the operator torque request.

12. The method of claim 11, wherein the optimal electrical power flow between the energy storage system and the first electric machine is determined based upon the maximum and minimum electrical power potentials from the energy storage device and the commanded motor torque from the second electric machine.

13. The method of claim 12, further comprising:
determining the maximum and minimum electrical power potentials of the energy storage device;
determining a range of motor torques from the first electric machine to meet the operator torque request based upon the maximum and minimum electrical power potentials of the energy storage device; and
identifying a preferred torque output from the first electric machine corresponding to the minimum electrical power potential of the energy storage device and the commanded motor torque from the second electric machine.

14. The method of claim 13, further comprising:
determining a range of motor torques from the second electric machine to meet the operator torque request based upon constraints of the energy storage device;
identifying a motor torque from the first electric machine corresponding to the minimum power within the constraints of the energy storage device and within the range of motor torques from the first electric machine; and
identifying a motor torque from the second electric machine to meet the operator torque request based upon constraints of the energy storage device and the identified motor torque from the first electric machine corresponding to the minimum power and within the range of motor torques from the second electric machine.

15. Method for determining an output from an electric machine operative to transmit torque to an electro-mechanical transmission, comprising:
operating the electro-mechanical transmission in a fixed gear operating range state and monitoring an operator torque request;
determining an input from an engine operative to transmit power to the electro-mechanical transmission;
determining electrical power constraints of an energy storage device operative to transmit power to the electric machine to meet the operator torque request;

determining a range of motor torques from the electric machine to meet the operator torque request based upon the power constraints of the energy storage device;

optimizing power output from the energy storage device; and determining a torque output from the electric machine corresponding to the optimized power output from the energy storage device;

wherein optimizing power output from the energy storage device comprises developing a mathematical formula representative of the power output from the energy storage device based upon clutch reaction torques, transmission speed ratios, and the torque output from the electric machine and the torque input from the engine, executing a partial derivative of the mathematical formula with respect to output torque to determine said minimum power flow, and equating said partial derivative to zero and solving for the output torque.

16. The method of claim 15, further comprising optimizing the power output from the energy storage device based upon the electrical power constraints from the energy storage device and a motor torque from a second electric machine operative to transmit torque to the electro-mechanical transmission to meet the operator torque request.

17. The method of claim 16, wherein the electric power constraints of the energy storage device are based upon a battery state of charge, a battery temperature, and an electric current throughput.

18. The method of claim 1, wherein developing a mathematical formula representative of the power flow between the energy storage system and the first and second electric machines comprises developing a mathematical formula in accordance with the following relationship:

$$P_{BAT} = (A_1 T_A + A_2)^2 + (B_1 T_B + B_2)^2 + C$$

wherein $T_A$ represents motor torque from the first electric machine, $T_B$ represents motor torque from the second electric machine, and $A_1, A_2, B_1, B_2$, and C represent scalar values determined in relation to the clutch reaction torques and transmission speed ratios; and wherein executing the partial derivative of said mathematical formula with respect to the output torque to determine said minimum power flow to determine said minimum power flow comprises executing a partial derivative of said mathematical formula with respect to the output torque in accordance with the following relationship:

$$\frac{dP_{BAT}}{dT_O} = 2a_1(a_1 T_O + a_2) + 2b_1(b_1 T_O + b_2)$$

wherein $T_o$ is the output torque, and $a_1, a_2, b_1$ and $b_2$ represent scalar values determined in relation to the clutch reaction torques and transmission speed ratios.

* * * * *